Patented June 20, 1933

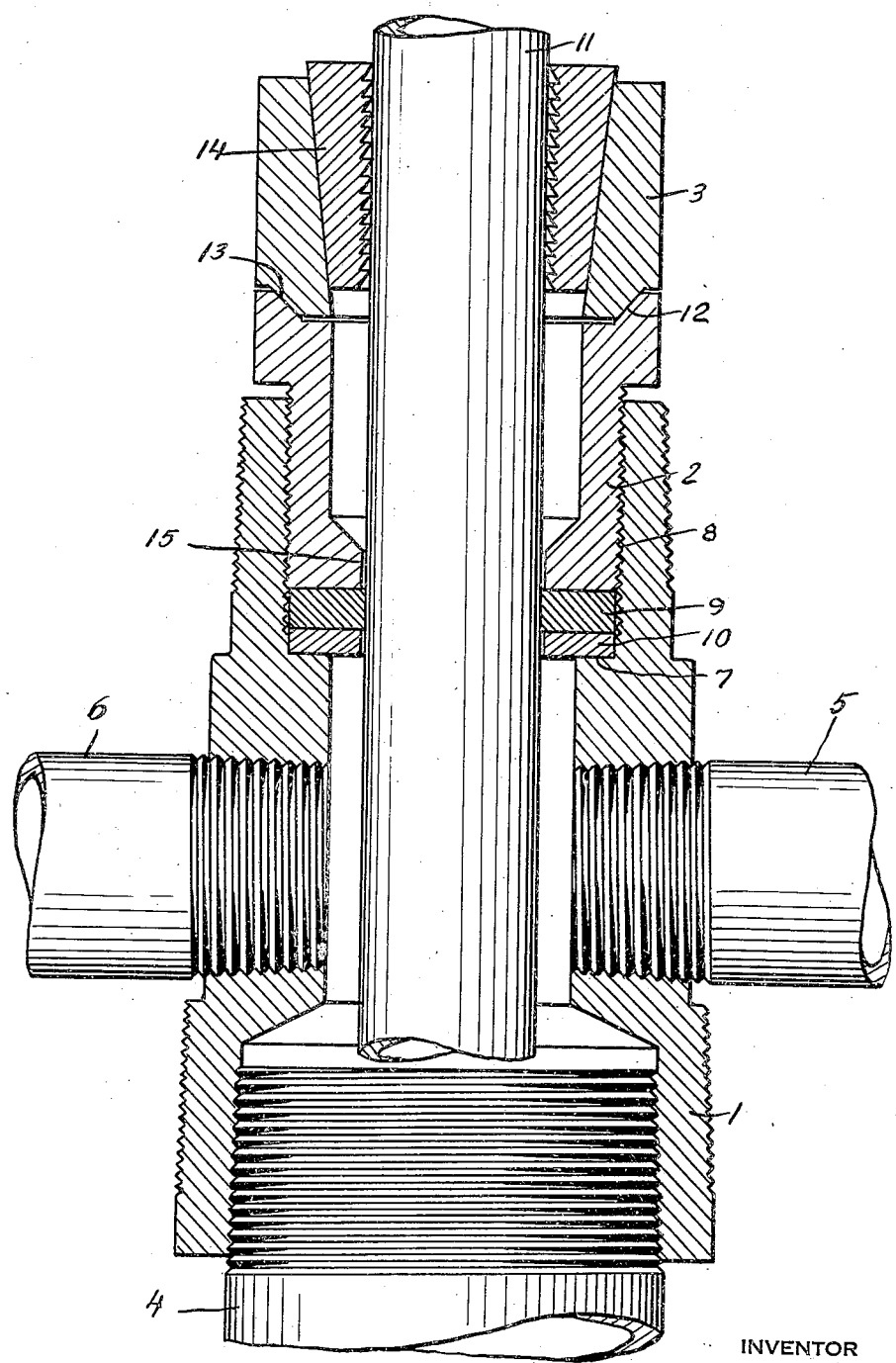

1,914,380

UNITED STATES PATENT OFFICE

GEORGE R. MILTON, OF SMITH COUNTY, TEXAS, ASSIGNOR TO SINCLAIR PRAIRIE OIL COMPANY, OF TULSA, OKLAHOMA, A CORPORATION OF MAINE

CASING HEAD

Application filed April 2, 1932. Serial No. 602,757.

This invention relates to improvements in casingheads and tubing hangers used in the production of petroleum from wells. The invention provides a combined casinghead and tubing hanger having several important advantages. For purposes both of safety and of economy, it is important to provide a fluid-tight joint between tubing and casing at the casinghead above the conventional branch outlets from the casing. The pressures which this joint must withstand are frequently very high. Various schemes for packing this joint have previously been proposed. Those proposals which have had the advantage of simplicity have, however, involved disadvantageous relationships between the packing and the means for suspending the tubing in the casing. The conventional means for suspending tubing in the casing is a slip collar provided with slips, wedge shaped annular segments, gripping the tubing by wedge action. For example, it has been proposed to embody a slip collar in the casinghead and to position packing upon the slips within the slip collar, but adequate support for the packing is not to be obtained in this manner.

The combined casinghead and tubing hanger of this invention comprises a head member adapted to be connected to the casing and provided with branch outlets and a tubing passage, the tubing passage being provided with a continuous annular shoulder facing away from the casing connection immediately above the branch outlets and an internally threaded enlargement of this passage above this continuous annular shoulder, a packing collar threaded into this enlargement of the tubing passage, the packing being positioned below this packing collar and on the continuous annular shoulder provided in the tubing passage, and the slips, for suspending the tubing, supported by the upper end of this packing collar. The slip supporting means, a slip collar, and the packing collar may be integral. However, the upper end of the packing collar is with advantage extended above the head member and shaped to receive and support a separate superimposed slip collar. Thus, although the packing is positioned beneath the slips, the packing is not subjected to any part of the load imposed by the suspended tubing, this load being carried to the casing head through the packing collar threaded into the casinghead. The provision of this continuous annular shoulder in the casinghead provides a particularly advantageous support for the packing. The bore through the packing collar is advantageously of a minimum diameter substantially the same as the diameter of the tubing to be supported. By providing packing collars for bores of different diameter, and corresponding sets of slips, a single combined fitting can be easily adapted to a number of sizes of tubing.

The invention will be further described in connection with the accompanying drawing which illustrates, to scale and in section on a plane through the axis of the casing when the combined fitting is in position thereon, a combined casinghead and tubing hanger embodying the invention.

Referring to the drawing, the combined casinghead and tubing hanger illustrated comprises a head member 1, a packing collar 2 and a slip collar 3. The head member 1 is threaded on the casing 4 and is provided with branch outlets 5 and 6 and a tubing passage extending upwardly through the head member on the axis of the casing. The tubing passage through the head member 1 is provided with a continuous annular shoulder 7 immediately above the branch outlets 5 and 6 and an internally threaded enlargement 8 of this passage above the continuous annular shoulder 7. The packing collar 2 is threaded into this internally threaded enlargement. Packing 9 is positioned below the packing collar 2 on the continuous annular shoulder 7. Any conventional packing, rubber packing for example, may be used. A packing ring 10 may with advantage be interposed between the packing 9 and the continuous annular shoulder 7. By means of the packing collar 2, the packing 9 is compressed against the tubing 11 to form a fluid-tight joint, the compression of the packing for this purpose, however, being entirely independent of other factors. The upper end of the packing collar 2 extends above the head member 1, and this upper end of the packing collar 2 is provided with an annular recess 12 adapted to receive a corresponding projection 13 on the slip collar 3. Slips 14, usually three in number, are positioned within the slip collar 3 to grip the tubing 11. The suspended tubing is supported by the head member 1 through the slips 14, the slip collar 3 and the packing collar 2, no part of this load being imposed upon the packing 9. The bore through the packing collar 12 has a minimum diameter, at 15, substantially the same as the outer diameter of the tubing 11, just enough difference being provided to permit of free passage of the tubing through the packing collar.

I claim:

A combined casing head and tubing hanger, consisting of a head member internally threaded at one end for making a threaded connection with the casing, said head member having laterally extending branch outlets and a longitudinally extending tubing passage, said head member also having a continuous horizontal annular shoulder facing away from the casing connection in said tubing passage above said branch outlets, the longitudinal passage through said head member being cylindrical, enlarged and internally threaded above said annular shoulder, compressible packing positioned on said shoulder, a packing collar threaded into said enlargement for compressing said packing and forcing it radially against the tubing to be supported in said passage, the lower end of said packing collar having an inner bore the diameter of which is substantially the outer diameter of the tubing to be supported, said packing collar extending above said head member and having the passage therethrough of a larger diameter than the diameter of the lower bore, the upper portion of said packing collar being adapted to receive and support a slip collar and a slip collar having an interior conical slip seat superimposed upon said packing collar.

In testimony whereof I affix my signature.

GEORGE R. MILTON.